United States Patent [19]

Carlson et al.

[11] 4,380,519
[45] Apr. 19, 1983

[54] PROCESS FOR EMBOSSING POLYMERIC SUBSTRATES BY USING A COMPOSITE STRUCTURE OF AN AROMATIC POLYAMIDE FABRIC COATED WITH A FLUOROSILICONE RUBBER

[75] Inventors: Richard H. Carlson, Clinton, Conn.; Gerald L. Gatcomb, Wilmington, Del.

[73] Assignee: E. I. Du Pont de Nemours and Company, Wilmington, Del.

[21] Appl. No.: 371,472

[22] Filed: Apr. 23, 1982

Related U.S. Application Data

[62] Division of Ser. No. 249,225, Mar. 30, 1981, Pat. No. 4,346,140.

[51] Int. Cl.³ ............................................. B29C 17/00
[52] U.S. Cl. ...................................................... 264/26
[58] Field of Search .................................... 264/25, 26

[56] References Cited

U.S. PATENT DOCUMENTS

| | | |
|---|---|---|
| 2,914,109 | 11/1959 | Hsu et al. ............................... 264/26 |
| 2,920,172 | 1/1960 | Stallard .................................. 264/26 |
| 2,922,865 | 1/1960 | Schlattler et al. ..................... 264/26 |
| 2,946,713 | 7/1960 | Dusina, Jr. et al. ................... 264/26 |
| 2,948,929 | 8/1960 | Stallard .................................. 264/26 |
| 2,969,327 | 1/1961 | Quehl ................................. 252/63.2 |
| 2,988,457 | 6/1961 | Gatcomb . |
| 3,025,185 | 3/1962 | Schmidt . |
| 3,063,966 | 11/1962 | Kwolek et al. ........................ 260/73 |
| 3,133,138 | 5/1964 | Alexander . |
| 3,265,551 | 8/1966 | Amanian et al. ...................... 264/26 |
| 3,507,683 | 4/1970 | Parsons . |
| 3,540,488 | 11/1970 | Voorhees ............................. 138/121 |
| 3,620,907 | 11/1971 | Yuan . |
| 3,756,908 | 9/1973 | Gross .................................... 162/146 |

FOREIGN PATENT DOCUMENTS

| | | | |
|---|---|---|---|
| 2383794 | 11/1978 | France .................................. 264/25 |
| 55-113523 | 9/1980 | Japan .................................... 264/26 |

*Primary Examiner*—James B. Lowe
*Attorney, Agent, or Firm*—Hilmar L. Fricke

[57] ABSTRACT

A process for embossing flexible polymeric substrates in a dielectric heating press having a platen and a design fixture by placing an insulating blanket of a composite sheet structure between the substrate being embossed and the platen of the press and embossing the substrate; wherein the composite sheet structure is an aromatic polyamide fabric coated on both sides with a 2-30 mil thick layer of a fluorosilicone rubber and having a dielectric constant of about 4-8 and a dissipation factor of about 0.015-0.030; the polymeric substrates generally are laminates of thermoplastic polyurethane form/short napped synthetic velour fabric used as upholstery for automobiles and trucks.

7 Claims, 2 Drawing Figures

PROCESS FOR EMBOSSING POLYMERIC SUBSTRATES BY USING A COMPOSITE STRUCTURE OF AN AROMATIC POLYAMIDE FABRIC COATED WITH A FLUOROSILICONE RUBBER

CROSS REFERENCE TO RELATED APPLICATIONS

This application is a divisional application of Ser. No. 249,225 filed Mar. 30, 1981 now U.S. Pat. No. 4,346,140.

BACKGROUND OF THE INVENTION

The invention is directed to process for embossing polymeric substrates by using a composite sheet structure that is used as a blanket in a dielectric press.

Dielectric presses are used to emboss designs on laminates such as a thick thermoplastic urethane foam laminated to a cotton scrim fabric on one side and a short napped synthetic velour fabric on the other side. These laminates are used as upholstery in automobiles and trucks. A blanket is positioned between the platens of the press and the substrate being embossed to prevent the substrate from sticking to the platens and prevent shorting of the platens of the press.

Blankets of silicone rubber layer adhered to a fiberglass cloth and blankets of fluorocarbon polymer layer adhered to a polyamide fabric have been used but these blankets act as a thermal barrier and do no heat up sufficiently during the embossing process and prevent development of sufficient heat in the laminate to emboss and seal a pattern into the laminate. A blanket is needed that has good electrical insulating properties and that will heat up internally during a dielectric embossing process and allow the substrate to be embossed.

SUMMARY OF THE INVENTION

A process for embossing flexible polymeric substrates in a dielectric heating press having a platen and a design fixture by placing a composite sheet structure between the substrate and the platen of the press and embossing the substrate; wherein the composite sheet structure comprising a layer about 2 to 30 mils thick of a fluorosilicone rubber in adherence to both sides of an aromatic polyamide fabric and having a dielectric constant of about 4 to 8 and a dissipation factor of about 0.015 to 0.030 where the dielectric constant and the dissipation factor are determined at a frequence of 1 megahertz.

DESCRIPTION OF THE INVENTION

Figure 1:
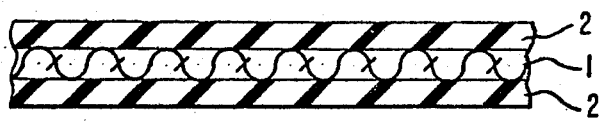
FIG. 1 shows a cross section of the composite sheet structure in which woven aromatic polyamide fabric 1 is coated on both sides with a layer of a fluorosilicone rubber 2.
Figure 2:
FIG. 2 shows a cross section of the composite sheet structure in which a non-woven or paper of aromatic polyamide fibrils 3 is coated on both sides with a fluorosilicone rubber 2.

The composite sheet structure used in this invention comprises an aromatic polyamide fabric coated on both sides with about 2–30 mil thick layer of a fluorosilicone rubber. Electrical characteristics of this structure that make it useful as an insulator blanket in a dielectric embossing process are a dielectric constant of about 4–8 and preferably about 5.5–6.5 and a dissipation factor of about 0.015 and 0.030 and preferably about 0.020–0.025.

The dielectric constant and the dissipation factor are both determined at a frequency of one megahertz according to ASTMD-1531.

The general range of physical properties of the sheet are as follows:

| | |
|---|---|
| Total Thickness | 15–75 mils |
| Grab Tensile Strength (warp and fill directions) | 100–1000 pounds |
| Burst Strength | 100–1000 pounds per square inch |
| Weight | 10–75 ounces per square yard |
| Fluorosilicone Rubber to Fabric Adhesion | 0.5–10 pounds per inch. |

The fabric is a wholly aromatic polyamide and can be woven, non-woven or a paper structure. Preferably, the fabric is a woven structure of a crystallized uniformly oriented poly(methaphenylene isophthalamide) as described in Alexander U.S. Pat. No. 3,133,138 issued May 12, 1964 which is hereby incorporated by reference. The fabric can be a nonwoven or paper structure of a wholly aromatic polyamide preferably poly(-metaphenylene isophthalamide) as described in Gross U.S. Pat. No. 3,756,908 issued Sept. 4, 1973 which is hereby incorporated by reference.

Preferably, before application of a fluorosilicone rubber layer to both sides of the polyamide fabric, the fabric is primed with a solution of the fluorosilicone rubber. This primer is a solution of a fluorosilicone rubber similar and preferably the same as the fluorosilicone rubber used for the exterior layers. The fluorosilicone rubber is dissolved in solvents such as methyl ethyl ketone, methyl isobutyl ketone or propyl acetate or mixtures thereof. About 1–10% of an organo silicone acetate may also be added. The fabric is coated on both side with a thin layer of the primer and then dried before the top layer of a fluorosilicone rubber is applied on both sides of the fabric.

The fluorosilicone rubber layer, preferably about 5–15 mils thick, is calendered onto both sides of the fabric using conventional calendering equipment in which one roll is cooled and held at about 25° C. The fluorosilicone rubber has a 65 Shore A Durometer and contains a fluorosilicone polymer, silica filler, pigment and an accelerator for curing. Typical fluorosilicone polymers are fluoroalkyl polysiloxanes having vinyl groups attached thereto and are designated as FVMQ type polymers according to ASTMD-1418.

To accelerate curing of the fluorosilicone rubber, the rubber contains about 0.1–5% by weight of a peroxide catalyst such as benzoyl peroxide, dichlorobenzoyl peroxide, dicumyl peroxide and ditertiary butyl peroxide. 2,4-dichloro benzoyl peroxide is preferred.

Generally, the fluorosilicone rubber is pigmented. Typical pigments that are used are carbon black, red iron oxide, titanium dioxide and other inorganic pigments.

To fully cure the fluorosilicone rubber coated sheet, the sheet is passed through a roto cure for about 3–10 minutes at a temperature of about 75°–175° C.

The composite sheet structure is particularly useful as a blanket in a dielectric embossing press. The blanket is placed between a platen of the press and the product being embossed. The excellent electrical characteristics of the structure allow the product to be heated and embossed, and provide insulation resistance so that the platens of the press do not short out. The dissipation factor of the structure is sufficiently high to provide for internal heating of the structure when subjected to a high frequency electric field used in a dielectric embossing press. Sufficient heat builds up in the structure to effect embossing of a product while the structure maintains adequate electrical insulation resistance to prevent the platens of the press from shorting out.

A typical product that is embossed using this composite sheet structure is a laminate used for automotive and truck upholstery which is a thick thermoplastic polyurethane foam having one side laminated to a cotton scrim fabric and the other to a synthetic short napped velour fabric. The composite sheet structure allows a clear design to be embossed in the velour and permanently sealed into the foam of the laminate.

Other sheet structures of a fiberglass/fluorosilicone rubber or aromatic polyamide fabric/fluorocarbon polymer have been used but these structures either do not heat up sufficiently internally and block heat from the laminate or short out the press and hence do not allow for embossing and sealing of a design into a laminate in a dielectric press.

The following examples illustrate this invention. All parts and percentages are on a weight basis unless otherwise indicated.

EXAMPLE 1

A fluorosilicone primer coating composition is prepared as follows:

|  | Parts by Weight |
|---|---|
| Fluorosilicone compound (Fluorosilicone polymer, silica filler, iron oxide pigment and about 1.3 parts per hundred/2,4-dichloro benzoyl peroxide) | 3.00 |
| Methyl ethyl ketone | 27.00 |
| Methyl isobutyl ketone | 4.00 |
| Organosilicone acetate solution (15% by weight solids in n-propyl acetate) | 1.20 |
| Total | 35.20 |

The fluorosilicone compound is mixed with half of the solvents and then churned until a smooth mixture is obtained and then the remainder of the solvents are added and mixed therewith. The organosilicone acetate solution is slowly added with constant mixing and mixed until a smooth mixture is obtained.

A heat resistant aromatic polyamide fabric is woven from 200 denier/2 filament yarn of a high molecular weight polyamide of poly(metaphenylene isophthalamide). Typical properties of the fabric are as follows:

| Width | 42 inches |
|---|---|
| Weight | 8 ounces per square yard |
| Thread Count | 76 warp × 73 fill |
| Weave | 2 × 2 basket |
| Tensile Strength (minimum) (Ravel, pounds ASTMD-1682) | 300 warp × 285 fill |
| Mullen Burst (pounds per square inch, PSI, ASTMD-751) | 900 |
| Thickness | 0.015 inches |

The fabric is primed with the above prepared fluorosilicone primer on a knife over roll spreader dip pan. The fabric is dipped in the primer, passed under the knife and over the roll to remove excess primer and passed into an oven at about 90° C. to evaporate solvent from the primer. The primed fabric then is coated on each side with about a 10 mil thick layer of the above described fluorosilicone compound using a 4 roll inclined Z calender with the calender rolls maintained at 25° C. After the coating is applied talc is dusted on the coating to prevent sticking. The resulting composite sheet structure is vulcanized in a rotocure for 5.5 minutes at a temperature of about 135° C.

The resulting composite sheet structure has the following typical properties:

| Thickness | 0.03 inches. |
|---|---|
| Grab Tensile (pounds) | 550 warp × 550 fill |
| Burst Strength (PSI) | 800 |
| Weight | 30 ounces per square yard |
| Coating to Fabric Adhesion | 2 pounds per inch |
| Dielectric constant | 6.0 |
| Dissipation factor | 0.021 |

The above prepared fluorosilicone coated polyamide composite structure is used as an insulator blanket between the press platens of a dielectric press to emboss and seal a design on a laminate of a thermoplastic polyurethane foam having a cotton scrim fabric laminated to one side and a synthetic short napped velour fabric on the other side. The composite structure heats up internally and does not act as a thermal barrier since it has a high dissipation factor and has adequate dielectric constant so that shorting out of the press platens does not occur. A clear design is embossed and sealed into the laminate.

A composite sheet structure is prepared identical to the above structure except a woven fiberglass fabric is used in place of the polyamide fabric. This composite sheet structure is used as an insulator blanket as above in an attempt to emboss the above described laminate. The composite sheet structure does not heat internally sufficiently to emboss the laminate and acts as a thermal barrier.

A composite sheet structure was made according to U.S. Pat. No. 3,025,185 issued Mar. 13, 1962 using the aforementioned woven polyamide fabric which is coated on both sides with a copolymer of vinylidene fluoride and hexafluoropropane. This composite sheet structure is used as an insulator blanket as above in an attempt to emboss the above described laminate. The composite sheet structure does not heat internally and sufficiently to emboss the laminate and acts as a thermal barrier.

We claim:

1. A process for embossing flexible polymeric substrates in a dielectric heating press having a platen and a design fixture by placing a composite sheet structure between the substrate being embossed and the platen of the press and embossing the substrate wherein the composite sheet structure comprises a layer about 2–30 mils thick of a fluorosilicone rubber firmly adhered to both side of an aromatic polyamide fabric and having a dielectric constant of about 4–8 and a dissipation factor of about 0.015–003 where the dielectric constant and dissipation factor are determined at one megahertz frequency according to ASTMD-1531.

2. The process of claim 1 in which the polyamide is an oriented crystalline poly(metaphenylene isothphalamide).

3. The process of claim 2 in which the fabric is a woven fabric.

4. The process of claim 2 in which the fabric is a paper of fibrils of said polyamide.

5. The process of claim 3 in which a primer of a fluorosilicone rubber is applied to both sides of the fabric.

6. The process of claim 5 in which the composite has a dielectric constant of about 5.5–6.5 and a dissipation factor of about 0.020–0.025.

7. The process of claim 1 in which the composite sheet structure comprising a layer of about 5–15 mils thick of a fluorosilicone rubber firmly adhered to both sides of a woven fabric or oriented crystalline poly(metaphenylene isothalamide) fibers primed on both side with a fluorosilicone rubber;

wherein the composite structure has a dielectric constant of about 5.5–6.5 and a dissipation factor of about 0.020–0.025.

* * * * *